(12) United States Patent
Hinds et al.

(10) Patent No.: US 7,421,139 B2
(45) Date of Patent: Sep. 2, 2008

(54) REDUCING ERRORS IN PERFORMANCE SENSITIVE TRANSFORMATIONS

(75) Inventors: Arianne Therese Hinds, Boulder, CO (US); Nenad Rijavec, Longmont, CO (US); Joan LaVerne Mitchell, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 779 days.

(21) Appl. No.: 10/960,253

(22) Filed: Oct. 7, 2004

(65) Prior Publication Data

US 2006/0089960 A1    Apr. 27, 2006

(51) Int. Cl.
G06K 9/46    (2006.01)
(52) U.S. Cl. .................. 382/248; 382/276; 382/280; 382/281
(58) Field of Classification Search ............... 382/276, 382/280, 281, 248, 236; 708/490, 620; 345/474, 345/643; 375/240.16, E7.03, E7.081
See application file for complete search history.

(56) References Cited

U.S. PATENT DOCUMENTS

| | | | |
|---|---|---|---|
| 3,871,578 A | 3/1975 | Van De Goor et al. | 235/164 |
| 4,760,548 A | 7/1988 | Baker et al. | 364/716 |
| 5,768,170 A | 6/1998 | Smith | 364/748.1 |
| 5,959,673 A * | 9/1999 | Lee et al. | 275/240.16 |
| 5,970,173 A * | 10/1999 | Lee et al. | 382/236 |
| 6,021,228 A | 2/2000 | Byrd | 382/240 |
| 6,128,636 A | 10/2000 | He | 708/204 |
| 6,233,595 B1 | 5/2001 | Cheng et al. | 703/503 |
| 6,401,194 B1 | 6/2002 | Nguyen et al. | 712/210 |
| 6,546,480 B1 | 4/2003 | Mandavilli et al. | 712/222 |
| 6,598,065 B1 | 7/2003 | Harrison | 708/654 |
| 6,629,891 B2 | 10/2003 | Nagayama | 463/32 |

FOREIGN PATENT DOCUMENTS

WO    WO 9414245 A1    6/1994

OTHER PUBLICATIONS

Trevor W. Fox et al, "Low Coefficient Complexity Approximations of the One Dimensional Discrete Cosinc Transform", 2002 IEEE.

* cited by examiner

*Primary Examiner*—Anh Hong Do
(74) *Attorney, Agent, or Firm*—Duft Bornsen & Fishman, LLP

(57) ABSTRACT

The invention provides a method, data compression system, apparatus, and article of manufacture which reduce the error in transform equations in which constants are replaced by approximations. According to the invention transform constants are replaced with approximations which are a function of an integer and a floating point value. The transform equation is then performed with the integers in place of the constants. The floating point value may be applied either to the result of the equation or to the data to be processed by the transform equation before the equation is performed. Further the floating point value may be applied using a fixed precision version of the value or a fixed precision value into which the floating point value has been factored.

57 Claims, 8 Drawing Sheets

Fig. 2 (prior art)

| Constant | Value | approximation | power-of-2 | Cost | Error | %error |
|---|---|---|---|---|---|---|
| C1 | 0.9808 | 40/41 = 0.9756 | $2^5 + 2^3$ | 1 | 0.0052 | 0.53 |
| C3 | 0.8315 | 34/41 = 0.8923 | $2^5 + 2^1$ | 1 | 0.0608 | 7.31 |
| C5 | 0.5556 | 23/41 = 0.5610 | $2^4 + 2^3 - 2^0$ | 2 | 0.0054 | 0.97 |
| C7 | 0.1951 | 8/41 = 0.1951 | $2^3$ | 0 | 0.0000 | 0.00 |
| | | | | average error | 0.0178 | |

Fig. 3

| Constant | Value  | approximation      | power-of-2      | Cost | Error  | %error |
|----------|--------|--------------------|-----------------|------|--------|--------|
| C1       | 0.9808 | 40/41.0899 = 0.9735 | $2^7+2^5$       | 1    | 0.0073 | 0.74   |
| C3       | 0.8315 | 34/41.0899 = 0.8275 | $2^7+2^3$       | 1    | 0.0040 | 0.49   |
| C5       | 0.5556 | 23/41.0899 = 0.5597 | $2^4+2^3-2^0$   | 2    | 0.0041 | 0.74   |
| C7       | 0.1951 | 8/41.0899 = 0.1947  | $2^3$           | 0    | 0.0004 | 0.21   |
|          |        |                    |                 |      | average error | 0.0048 |

Fig. 4

| Constant | Value  | approximation       | power-of-2    | Cost | Error  | %error |
|----------|--------|---------------------|---------------|------|--------|--------|
| C1       | 0.9808 | 20/20.9949 = 0.9526 | $2^4+2^3$     | 1    | 0.0282 | 2.88   |
| C3       | 0.8315 | 17/20.9949 = 0.8097 | $2^4+2^1$     | 1    | 0.0218 | 2.62   |
| C5       | 0.5556 | 12/20.9949 = 0.5716 | $2^3+2^2$     | 1    | 0.0160 | 2.88   |
| C7       | 0.1951 | 4/20.9949 = 0.1905  | $2^2$         | 0    | 0.0046 | 2.36   |
|          |        |                     |               |      | average error | 0.0177 |

Fig. 5

| Constant | Value | approximation | power-of-2 | Cost | Error | %error |
|---|---|---|---|---|---|---|
| C1 | 0.9808 | 5/5.1051 = 0.9794 | $2^2 + 2^0$ | 1 | 0.0014 | 0.14 |
| C3 | 0.8315 | 4/5.1051 = 0.7835 | $2^2$ | 0 | 0.0480 | 5.77 |
| C5 | 0.5556 | 3/5.1051 = 0.5876 | $2^1 + 2^0$ | 1 | 0.0321 | 5.78 |
| C7 | 0.1951 | 1/5.1051 = 0.1959 | $2^0$ | 0 | 0.0008 | 0.40 |
| | | | | average error | 0.0206 | |

Fig. 6

| Constant | Value | approximation | power-of-2 | Cost | Error | %error |
|---|---|---|---|---|---|---|
| C1 | 0.9808 | 160/163.5753 = 0.9781 | $2^7 + 2^5$ | 1 | 0.0027 | 0.28 |
| C3 | 0.8315 | 136/163.5753 = 0.8314 | $2^6 + 2^3$ | 1 | 0.0001 | 0.01 |
| C5 | 0.5556 | 91/163.5753 = 0.5563 | $2^6 + 2^5 - 2^2 - 2^0$ | 3 | 0.0007 | 0.13 |
| C7 | 0.1951 | 32/163.5753 = 0.1956 | $2^5$ | 0 | 0.0005 | 0.27 |
| | | | | average error | 0.0039 | |

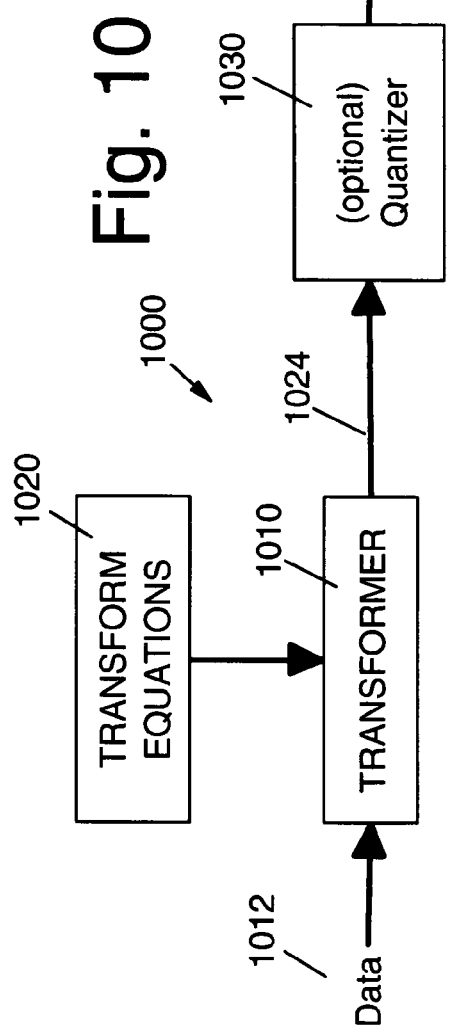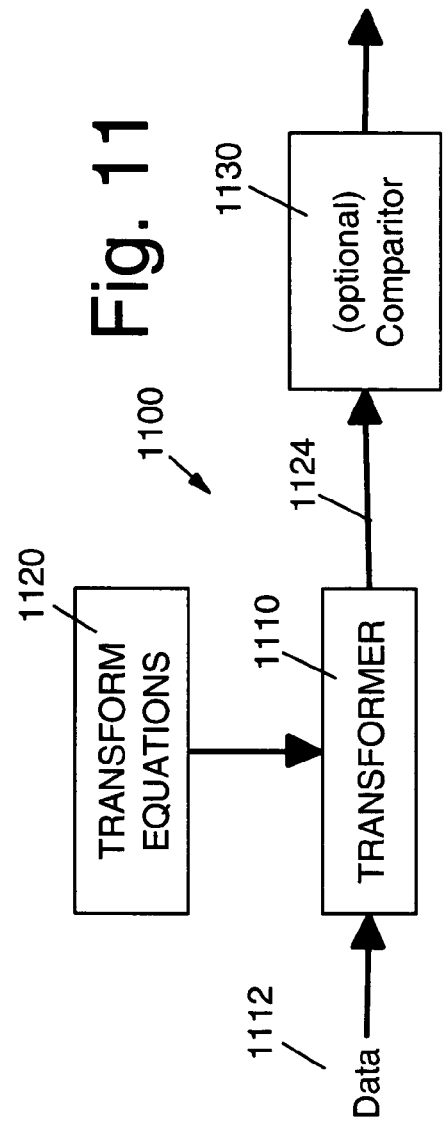

REDUCING ERRORS IN PERFORMANCE SENSITIVE TRANSFORMATIONS

CROSS REFERENCE TO RELATED APPLICATIONS

This application is related to the following co-pending and commonly-assigned patent applications, which are hereby incorporated herein by reference in their respective entirety:

"Compensating for errors in performance sensitive transformations"" to Hinds et al., Ser. No. 10/960,255.

"Improving approximations used in performance sensitive transformations which contain sub-transforms" to Mitchell et al., 60/616,689.

BACKGROUND TO THE INVENTION

1. Field of the Invention

This invention relates in general to data processing, and more particularly to reducing errors in performance sensitive transformations 2. Description of the Related Art Transforms, which take data from one domain (e.g., sampled data) to another (e.g., frequency space), are used in many signal and/or image processing applications. Such transforms are used for a variety of applications, including, but not limited to data analysis, feature identification and/or extraction, signal correlation, data compression, or data embedding. Many of these transforms require efficient implementation for real-time and/or fast execution whether or not compression is used as part of the data processing.

Data compression is desirable in many data handling processes, where too much data is present for practical applications using the data. Commonly, compression is used in communication links, to reduce transmission time or required bandwidth. Similarly, compression is preferred in image storage systems, including digital printers and copiers, where "pages" of a document to be printed may be stored temporarily in memory. Here the amount of media space on which the image data is stored can be substantially reduced with compression. Generally speaking, scanned images, i.e., electronic representations of hard copy documents, are often large, and thus make desirable candidates for compression.

In data processing, data is typically represented as a sampled discrete function. The discrete representation is either made deterministically or statistically. In a deterministic representation, the point properties of the data are considered, whereas, in a statistical representation, the average properties of the data are specified. In particular examples referred to herein, the terms images and image processing will be used. However, those skilled in the art will recognize that the present invention is not meant to be limited to processing still images but is applicable to processing different data, such as audio data, scientific data, sensor data, video data, etc.

In a digital image processing system, digital image signals are formed by first dividing a two-dimensional image into a grid. Each picture element, or pixel, in the grid has associated therewith a number of visual characteristics, such as brightness and color. These characteristics are converted into numeric form. The digital image signal is then formed by assembling the numbers associated with each pixel in the image into a sequence which can be interpreted by a receiver of the digital image signal.

Signal and image processing frequently require converting the input data into transform coefficients for the purposes of analysis. Often only a quantized version of the coefficients is needed (e.g. JPEG/MPEG data compression or audio/voice compression). Many such applications need to be done fast in real time such as the generation of JPEG data for high speed printers.

Pressure is on the data signal processing industry to find the fastest method by which to most effectively and quickly perform the digital signal processing. As in the field of compression generally, research is highly active and competitive in the field of fast transform implementation. Researchers have made a wide variety of attempts to exploit the strengths of the hardware intended to implement the transforms by exploiting properties found in the transform and inverse transform.

One such technique is the ISO 10918-1 JPEG International Standard/ITU-T Recommendation T.81. The draft JPEG standard is reproduced in Pennebaker and Mitchell, "JPEG Still Image Data Compression Standard", New York, Van Nostrand Reinhold, 1993, incorporated herein by reference. One image analysis method defined in the JPEG standard, as well as other emerging compression standards, is discrete cosine transform (DCT) coding. With DCT coding, images are decomposed using a forward DCT (FDCT) and reconstructed using an inverse DCT (IDCT). An excellent general reference on DCTs is Rao and Yip, "Discrete Cosine Transform: Algorithms Advantages and Applications", New York, Academic Press, 1990, incorporated herein by reference. It will be assumed that those of ordinary skill in this art are familiar with the contents of the above-referenced books.

It is readily apparent that if still images present storage problems for computer users and others, motion picture storage problems are far more severe, because full-motion video may require up to 60 images for each second of displayed motion pictures. Therefore, motion picture compression techniques have been the subject of yet further development and standardization activity. Two important standards are ISO 11172 MPEG International Standard and ITU-T Recommendation H.261. Both of these standards rely in part on DCT coding and IDCT decoding.

DCT is an example of a linear transform algorithm, and in such transforms it is common for floating point constants to be used in multiplication operations. However floating point multiplication operations are expensive in terms of processor computations, and consequently slow down the speed at which the transform executes. As a result in applications in which the speed of processing is important, such as in JPEG/MPEG compression, designers seek to replace these floating point multiplications with integer multiplication operations which are faster to execute. Current designs demonstrate three general approaches by which this is achieved:

"Development of Integer Cosine Transforms by the Principle of Dyadic Symmetry", Cham, W.-K, IEE Proceedings, Vol. 136, Pt. 1, No 4, August 1989 describes replacing the floating point multiplications with multiplications done in fixed precision, i.e. approximate the floating point constant with an integer.

"Multiplierless Approximation of Transforms with Adder Constraint", Chen, Ying-Jui, Soontorn Oraintara, Trac D. Tran, Kevin Amaratunga, Truong Q. Nguyen, IEEE Signal Processing Letters, Vol. 9, No. 11, November 2002, describes approximating the floating point constant multiplication or integer multiplication with a series of shift and add operations. In this approach, the goal is to implement the multiplication operation in terms of shift and add operations on the multiplicand.

U.S. Pat. No. 6,766,341—Fast transform using scaled terms, to IBM Corp. describes approximating the floating point constant by finding a ratio (i.e. an integer numerator and an integer denominator) in which the numerator represents the bit patterns to be used in shift/add operations (as in "Multiplierless Approximation of Transforms with Adder Constraint" above), and the denominator scales the final result to achieve the accuracy of the approximation. Note that in this case, the shifts and adds are done during the processing of the inputs to the transform, and the denominator (divide operation or multiplication by the inverse) is folded into the quantization step.

However, the problem posed by replacing floating point operations with fast approximations is actually a multi-criteria optimization problem. Criterion one is to find an approximation that is quick to execute. This criterion refers to the "cost" of an approximation in terms of shifts and adds. The greater the number of shift and add operations, then the greater the total cost to execute all of the operations. Criterion two (equal in import to criterion one) is to mitigate any error, in the final transform output, which result from the approximations. As demonstrated in the prior art, scientists and engineers use different approaches to finding good approximations, but in general, their approaches all use heuristics and sometimes, guesses, at what truly constitutes a good balance between speed and accuracy, and the result is algorithms in which accuracy is sacrificed in the pursuit of optimal cost.

Accordingly what is needed is an algorithm which improves the accuracy of transform equation approximations without sacrificing performance.

SUMMARY OF INVENTION

To overcome the limitations in the prior art described above, and to overcome other limitations that will become apparent upon reading and understanding the present specification, the present invention discloses fast transforms which seek to provide more optimal solutions when approximating floating point constants in transform equations. In this context, a solution which is more optimal is one in which for a particular cost transform equation execution, there is no prior art solution that offers less error for that same cost.

The present invention implements solutions with a structure which improves on the ratio approach described in above in U.S. Pat. No. 6,766,341. This is achieved by increasing accuracy by using floating point values where U.S. Pat. No. 6,766,341 uses integer approximations, but in a manner which does not increase the associated cost in terms of performance.

Accordingly, according to a first aspect the present invention provides a method comprising: determining, for a transform constant of a transform equation, an integer value and a floating point value, wherein a function of the integer value and floating point value approximates to the transform constant value; performing the transform equation, using the integer value in place of the transform constant, to produce a result; and modifying the result using the floating point value.

According to a second aspect the present invention provides a data compression system comprising: a transformer for: performing a transform equation by determining, for a transform constant of the transform equation, an integer value and a floating point value, wherein a function of the integer value and floating point value approximates to the transform constant value; and performing the transform equation, using the integer value in place of the transform constant, to produce a result; and a quantizer for: modifying the result using the floating point value.

According to a third aspect the present invention provides an article of manufacture comprising a program storage medium readable by a computer, the medium tangibly embodying one or more programs of instructions executable by a computer to perform a method for performing a transform equation, the method comprising: determining, for a transform constant of a transform equation, an integer value and a floating point value, wherein a function of the integer value and floating point value approximates to the transform constant value; performing the transform equation, using the integer value in place of the transform constant, to produce a result; and modifying the result using the floating point value.

According to a fourth aspect the present invention provides a method comprising: determining, for a transform constant of a transform equation, an integer value and a floating point value, wherein a function of the integer value and floating point value approximates to the transform constant value; modifying input data using the floating point value; and performing the transform equation on the modified data, using the integer value in place of the transform constant.

According to a fifth aspect the present invention provides an apparatus comprising: memory for storing image data; a processor for processing the image data to provide a compressed print stream output; and a printhead driving circuit for controlling a printhead to generate a printout of the image data; wherein the processor applies a transform equation to the image data by: determining, for a transform constant of a transform equation, an integer value and a floating point value, wherein a function of the integer value and floating point value approximates to the transform constant value; modifying the image data using the floating point value; performing the transform equation on the modified image data and using the integer value in place of the transform constant;

According to a sixth aspect the present invention provides an article of manufacture comprising a program storage medium readable by a computer, the medium tangibly embodying one or more programs of instructions executable by a computer to perform a method for performing a transform equation, the method comprising: determining, for a transform constant of a transform equation, an integer value and a floating point value, wherein a function of the integer value and floating point value approximates to the transform constant value; modifying input data using the floating point value; and performing the transform equation on the modified data, using the integer value in place of the transform constant.

Preferably, if a transform equation comprises one or more additional transform constants, an integer value for each transform constant is determined such that a function of each integer and the floating point value is an approximation to the transform constant value for which the integer was determined. In this case the equation is performed using each integer value in place of the transform constant value for which the integer was determined. Note that the floating point value is common to all transform constants.

Depending on the integer value chosen for each constant and the floating point value, the cost of performing the transform equation and the error introduced by the approximation can be different. Preferably the integer values and floating pointing value are chosen to satisfy an error and/or cost related requirement.

Optionally modifying the result using the floating point value is performed as part of a quantization step. Further, if this is done, preferably the quantization step calculates a quantized result of the transform equation using a multiplication value which was obtained from a floating point multiplication of a quantization value and a scaling factor, wherein the scaling factor comprises the floating point value. This multiplication value is then converted to fixed precision before using it to modify the result.

Alternatively the floating point value is converted to fixed precision before it is used for modifying the result.

Optionally modifying the input data using the floating point value is performed as part of a de-quantization step. Further, if this is done, preferably the de-quantization step calculates a de-quantized version of the input data using a multiplication value which was obtained from a floating point calculation preformed with a quantization value and a scaling factor, wherein the scaling factor comprises the floating point value. This multiplication value is then converted to fixed precision before using it to modify the result.

Alternatively the floating point value is converted to fixed precision before it is used for modifying the input data.

Preferably converting a value to fixed precision comprises multiplying the value by a power of 2, wherein the power of 2 selected is determined to be the smallest power of 2 which results in a predetermined acceptable error.

The transform equation may be used to transform any type of data which comprises samples of data comprising a plurality of discrete values, for example jpeg or mpeg images.

BRIEF DESCRIPTION OF THE DRAWINGS

Some of the purposes of the invention having been stated, others will appear as the description proceeds, when taken in connection with the accompanying drawings, in which:

FIG. 2 is a example of approximations used to replace transforms constants according to the prior art;

FIGS. 3 to 6 are examples of approximations used to replace transform constants according to the preferred embodiment of the present invention;

FIG. 10 is a block diagram of a data analyzing system according to the preferred embodiment of the present invention; and FIG. 11 is a block diagram of another data analyzing system according to the preferred embodiment of the present invention.

DETAILED DESCRIPTION OF THE ILLUSTRATIVE EMBODIMENTS

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
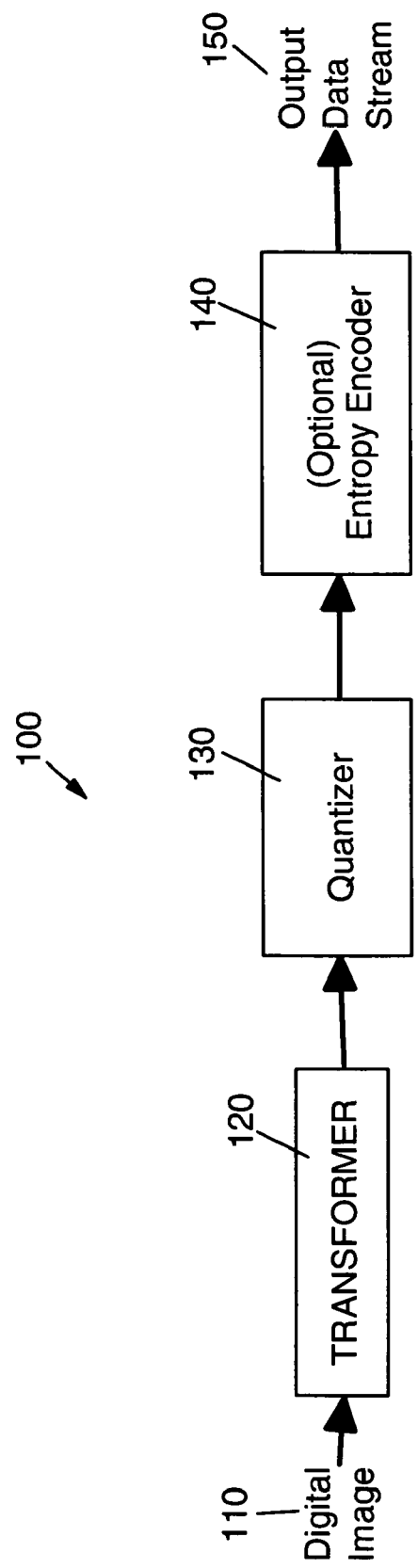
FIG. 1 is prior art image compression system 100 in which the present invention could be advantageously applied.

FIG. 1 illustrates a prior art image compression system 100 in which the present invention could be advantageously applied. The image compression system may include three closely connected components namely (a) Transformer 120, (b) Quantizer 130, and (c) Optional Entropy Encoder 140. Compression is accomplished by applying a linear transform to decorrelate the image data 110, quantizing the resulting transform coefficients, and, if desired, entropy coding the quantized values. A variety of linear transforms have been developed which include Discrete Fourier Transform (DFT), Discrete Cosine Transform (DCT), Discrete Wavelet Transform (DWT) and many more, each with its own advantages and disadvantages.

The quantizer 130 simply reduces the number of bits needed to store the transformed coefficients by reducing the precision of those values. Since this is a many-to-one mapping, it is a lossy process and is a significant source of compression in an encoder. Quantization can be performed on each individual coefficient, which is known as Scalar Quantization (SQ). Quantization can also be performed on a collection of coefficients together, and this is known as Vector Quantization (VQ). Both uniform and non-uniform quantizers can be used depending on the problem at hand.

The optional entropy encoder 140 further compresses the quantized values losslessly to give better overall compression. It uses a model to accurately determine the probabilities for each quantized value and produces an appropriate code based on these probabilities so that the resultant output code stream will be smaller than the input stream. The most commonly used entropy encoders are the Huffman encoder and the arithmetic encoder, although for applications requiring fast execution, simple run-length encoding (RLE) has proven very effective.

The term image transforms usually refers to a class of unitary matrices used for representing images. This means that images can be converted to an alternate representation using these matrices. These transforms form the basis of transform coding. Transform coding is a process in which the coefficients from a transform are coded for transmission.

Consider the signal $f(x)$ which is a function mapping each integer from $0 \ldots n-1$ into a complex number. An example is given by a line of a sampled or pixelated image, where the samples or pixels are equally spaced. An "orthogonal basis" for a collection of such $f(x)$ is a set $\{b_y(x)\}_{y=0}^{n-1}$ of functions, where $$\sum_{x=0}^{n-1} b_y(x)b_z(x) = 0$$

for $y \neq z$. A "transform" of $f(x)$, denoted $F(y)$, is given by $$F(y) = \sum_{x=0}^{n-1} f(x)b_y(x).$$

Transforms of this type are used in many signal and image processing applications to extract information from the original signal $f$. One example of a transform is the discrete Fourier transform (DFT), where $b_y(x) = \exp(2\pi i x y/n)$. A related example is the discrete cosine transform (DCT), where $b_y(x) = \cos(2\pi x y/n)$ Another example is the wavelet transform, where $b_y(x)$ is a particular scaled and offset version of the mother wavelet function. (See, Ingrid Daubechies, *Ten Lectures on Wavelets*, Society for Industrial & Applied Mathematics, (May 1992)).

The theoretical basis for the independent scaling operations will now be demonstrated by showing the mathematical basis for being able to perform the scales without destroying the structure of the transform. Define a transform $$F(y) = \sum_{x=0}^{n-1} f(x)b_y(x).$$

Consider those cases (described below) when the $b_y(x)$ are such that this transform can be split into two or more disjoint sums, regardless of the structure of $f(x)$. (The term "disjoint", when used herein in reference to the sets of equations, means that there are no transform coefficients in common between equations in the two disjoint sets of equations.) For example, if $b_{2y}(x)$ have even symmetry, and $b_{2y+1}(x)$ have odd symmetry, it is known from mathematics that any $f(x)$ can be written uniquely as $f(x)=f_e(x)+f_o(x)$, where $f_e(x)$ is even (symmetric about zero) and $f_o(x)$ is odd (non symmetric about zero), and that $$\sum_x f_e(x)b_{2y-1}(x) = \sum_x f_o b_{2y}(x) = 0.$$

This enables the transform to be written equivalently as:

$$F(y) = \sum_{y=0}^{\lfloor (n-1)/2 \rfloor} f_e(x)b_{2y}(x) + \sum_{y=1}^{\lfloor n/2 \rfloor} f_o(x)b_{2y-1}(x)$$

An example of such a transform is a 1-D DCT which is used, for example, to decompose a set of 8 grey-scale samples to their underlying spatial frequencies. Further a 1-D DCT can be extended to apply to 2-D Images which require and 8×8 array of samples. 2-D images are processed by multiplying a horizontally oriented set of 1-D DCT functions by a vertically oriented set of the same functions, such an arrangement being a 2-D DCT. However for the purposes of describing the preferred embodiment of the present invention a 1-D DCT will be used, and a skilled person will realize that this can be considered equivalent to processing the top row of an 8×8 2-D image sample, such as for a JPEG image.

In a 1-D DCT transformation the set of eight samples are represented by 8 values $s(x)$ for $x=0$ to 7, and each is transformed using a Forward DCT (FDCT) which comprises the following equations:

$$S(u) = (C(u)/2) \sum_{x=0}^{7} s(x) \cos[(2x+1)u\pi/16]$$

The transformed image is then reconstructed using an Inverse DCT (IDCT) which comprises the following equations:

$$s(x) = \sum_{u=0}^{7} (C(u)/2)S(u)\cos[(2x+1)u\pi/16]$$

In which:
u=0 to 7
$C(u)=1/\sqrt{2}$ for u=0
$C(u)=1$ for u>0 s(x)=value from JPEG sample
S(u)=DCT coefficient for JPEG sample values

However, if these equations were followed in full, the cost in terms of execution would be high because the mathematical executions are complex and many. As a result the equations are reduced to a more simple set, such a set being known as Fast DCT. One well known FAST DCT for the above 1-D FDCT results in the following equations:

$2 S(0) = C_4(s_{0734} + s_{1625})$ $2 S(1) = C_1 d_{07} + C_3 d_{16} + C_5 d_{25} + C_7 d_{34}$ $2 S(2) = C_2 d_{0734} + C_6 d_{1625}$ $2 S(3) = C_3 d_{07} - C_7 d_{16} - C_1 d_{25} - C_5 d_{34}$ $2 S(4) = C_4(s_{0734} - s_{1625})$ $2 S(5) = C_5 d_{07} - C_1 d_{16} + C_7 d_{25} + C_3 d_{34}$ $2 S(6) = C_6 d_{0734} - C_2 d_{1625}$ $2 S(7) = C_7 d_{07} - C_5 d_{16} + C_3 d_{25} - C_1 d_{34}$

In which:

$C_n = \cos(n\pi/16)$ $s_{jk} = s(j) + s(k)$ $s_{jklm} = s(j) + s(k) + s(l) + s(m)$ $d_{jk} = s(j) - s(k)$ $d_{jklm} = s(j) + s(k) - s(l) - s(m)$ If this FAST FDCT were used in executing the transform it would require 22 multiplications and 28 additions. However the constants $C_n$ are floating point values and therefore result in expensive floating point multiplications. Accordingly, in the prior art, such as U.S. Pat. No. 6,766,341, the constants are replaced with integer approximations. For example FIG. 2 shows the approximations that could be used, according to the prior art, for calculating the result of the following subset of the fast FDCT equations described above:

$2 S(1) = C_1 d_{07} + C_3 d_{16} + C_5 d_{25} + C_7 d_{34}$ $2 S(3) = C_3 d_{07} - C_7 d_{16} - C_1 d_{25} - C_5 d_{34}$ $2 S(5) = C_5 d_{07} - C_1 d_{16} + C_7 d_{25} + C_3 d_{34}$ $2 S(7) = C_7 d_{07} - C_5 d_{16} + C_3 d_{25} - C_1 d_{34}$

The table in FIG. 2 shows the constant to which the approximation relates and its associated value to four decimal places. Note that the numbers in the figures are shown to 4 decimal places in order to keep the figures relatively simple, although in practice further decimal places may be used. The next column shows the integer approximation which may be used in place of the constant value, for example $C_1$ is approximated to $40/41$, and the number which this equals to four decimal places. Note that for all constants the integer denominator is the same (41) and this enables the division by 41 to be deferred to a later step, such as quantization, and this also means that only a single division is needed. Accordingly, for example, the equations for S(1), S(3), S(5) and S(7) are rewritten:

$41*2 S(1) = 40*d_{07} + 34*d_{16} + 23*d_{25} + 8*d_{34}$ $41*2 S(3) = 34*d_{07} - 8*d_{16} - 40*d_{25} - 23*d_{34}$ $$41*2\ S(5) = 23*d_{07} - 40*d_{16} + 8*d_{25} + 34*d_{34}$$

$$41*2\ S(7) = 8*d_{07} - 23*d_{16} + 34*d_{25} - 40*d_{34}$$

Accordingly the requirement for floating point calculations when evaluating the equation is removed and replaced with integer multiplications. Further the cost of the each integer multiplication can be reduced to a series of shift and addition operations, and the minimum number of these operations is achieved by expressing the integer in the minimum number of power-of-2 terms. This is because each power-of-2 term represents a shift of the value being multiplied, and each additional power-of-2 term more than one, incurs an addition/subtraction. Note that term addition is used to also include subtraction in this sense that a subtraction operation may be considered an addition of a negative number. So, for example, in calculating $40*d_{07}$:

$$\begin{aligned}40*d_{07} &= (2^5 + 2^3)*d_{07}\\ &= 2^5 d_{07} + 2^3 * d_{07}\\ &= d_{07} << 5 + d_{07} << 3\end{aligned}$$

Accordingly this requires 2 shifts (<<) and one addition operation. Further this is the cheapest way of multiplying $d_{07}$ by 40 because any other expression of 40 in power of 2 terms would require more power-of-2 terms and therefore more shift and addition operations. Note that the form of a number expressed in the minimum number or power of two terms is known as its irreducible form.

The table of FIG. 2 shows the power of 2 terms which represent the irreducible forms for each of the integer denominators, and the cost, in terms of additions, associated with each of those irreducible forms. Accordingly an equation involving C1, C3, C5 and C7, using the integer expressions shown, would incur a cost of 4 addition. Note that cost is expressed in terms of additions because additions are significantly more expensive than shifts and further each power of 2 term above one incurs one shift and one addition, so the fewer the additions the fewer the shifts.

The next two columns in the table show the error introduced by the approximation, the first column being the absolute error, which is the difference between the actual value of the constant and the value of the integer representation, and the second column the relative error, that is the % age of the absolute error to the actual value. This shows small errors are introduced by the approximation with the exception of the approximation for C3 which has a 7.31% error and can therefore introduce significant error to equation calculations which use it. Finally the table shows an average error which is sum of the absolute errors divided by the number of approximations. However note that this is just a guide to the error which may be introduced into the S(n) value being calculated, because in practice the error introduced by the absolute error in each approximation will depend on the size of the $d_{jk}$ which is multiplied by it. Further errors introduced by one approximation may partially cancel out errors introduced by another approximation, for example if one has a net positive effect and the other has a net negative effect. However, in this respect, note that in FIG. 2 the majority of the error is introduced by the C3 approximation and as a result, in this example, any canceling out of errors can only have a relatively small impact on the final error.

An object of the present invention is, for example, to provide a method for performing a DCT which is more optimal than any other prior art solution in that it offers less error for the same cost. This is achieved according to the preferred embodiment of the present invention by approximating the constant values of a transform equation using an integer numerator and floating point denominator. Accordingly FIG. 3 is a table which shows how the approximations of FIG. 2 are changed according to the preferred embodiment of the present invention. In FIG. 3 the integer numerators of the approximations are the same as FIG. 2 but the denominators are replaced with a common floating point value of 41.0899. Accordingly the cost, in terms of additions associated with the denominators, is the same as for FIG. 2. However the absolute error and % age error for C5 are significantly reduced and as a result the average absolute error is reduced to 0.0048 (compared to 0.0178 in FIG. 2) with no increase in cost. Further, because the absolute error is relatively evenly distributed amongst the constants there is a better chance of errors canceling out each other.

Further FIG. 4 shows an alternative set of approximations according to the preferred embodiment of the present invention, which can be executed at a total cost of 3 additions. In the figure the integer numerators have changed and the common denominator is now 20.9949. As a result of this change the number of additions is reduced to 3, but this is at the expense of an increase in average error to 0.0177 when compared to the 0.0048 average error of FIG. 3. However, note that whilst in comparison to FIG. 2 the average absolute error is roughly equal, this is achieved with one less addition. Further, compared to FIG. 2, the error introduced is distributed relatively evenly amongst the constants and as a result there is more chance of the errors canceling each other out.

FIGS. 5 and 6, show further alternative sets of approximations according to the preferred embodiment of the present invention, FIG. 5 for a cost of 2 additions and FIG. 6 for a cost of 5 additions. From these figures and FIGS. 4 and 5 it can be seen that the greater the cost in terms of additions that is tolerated, the more accurate the approximations become and this is illustrated in the average error values.

Accordingly it has been shown that by using appropriate floating point denominators when approximating constants in a transform, the error introduced by the approximation is reduced when compared with the prior art solution described with reference to FIG. 2 which for a given cost, in terms of the number of additions/subtractions, introduces more error. Further whilst this has been shown in relation to a subset of a set transform equations a skilled person will realize that the invention could be applied to any equation in the set including, for the 1-DCT under consideration, the equations:

$$2\ S(0) = C_4(s_{0734} + s_{1625})$$

$$2\ S(2) = C_2 d_{0734} + C_6 d_{1625}$$

$$2\ S(4) = C_4(s_{0734} - s_{1625})$$

$$2\ S(6) = C_6 d_{0734} - C_2 d_{1625}$$

Notice that the equations relating to S(0) and S(4) contain a single constant and therefore only require a single integer numerator and floating point denominator which can approximate to the exact value of C4.

However, using a floating point denominator leaves the problem of factoring a floating point denominator into the final result of the equations, because even if this is left to the quantization stage, it still introduces a floating point calculation.

In quantization the S(n) values are divided by quantization constants, which are generally an integers, in order to reduce them in size and therefore enable compression of the data. For example, if X(1) is the result of the right side of the equation:

$$41.0899*2\ S(1)=40*d_{07}+34*d_{16}+23*d_{25}+8*d_{34}$$

then the quantized value of S(1) is $$S(1)/Q(1)=X(1)/(Q*2*41.0899)$$

where Q(1) is the quantization constant, and 41.0899 is a floating point value.

However, one option which may be used to remove the need to perform this floating point multiplication is to convert the floating point value to fixed precision for the purposes of this calculation. In this case the calculation is performed by: converting the floating point value to fixed precision by shifting it "n" bits to the left; rounding the result of the shift after the decimal point; performing the calculation in fixed precision; and shifting the result by "n" bits in order to correct for the shift left of the floating point value (this could be a shift left depending on whether the shift "n" bits to the left is done to the denominator or its inverse). In this case, in general, the larger the value of "n", the less the error introduced by the truncation, but the greater the number of bits required to perform the calculations.

However, in the preferred embodiment of the present invention, for example when considering the equation:

$$S(1)/Q(1)=X(1)/(Q(1)*2*41.0899)$$

use is made of the time of availability of the various values where time of availability is considered in terms of design time, initialization time and run time. Design time is the time when, for example, the software to perform the transform calculations is written, initialization time is when, for example, a JPEG image is received and initial calculations are made in preparation for performing transformation or reconstruction of the image, and run time is the time when the transformation or reconstruction is performed.

In the equation above, for example: the values 2 and 41.0899 are known at design time because these are a function of the DCT which is used by the software to transform the data; the value of Q(1) is known at initialization time because the Q(1) constant applies all S(1) calculation for the entire image, and the value of X(1) is known at run time because this represents the image data. Accordingly, some components of the calculation can be made in advance of run time in order to reduce both the complexity of the calculation at run time and the error that might be introduced by using approximations for floating point values known ahead of run time.

Looking at this equation in a more general way to cover, for example, all equations in a DCT transform, it may be written:

$$S(n)/Q(n)=(X(n)*sf(n))/Q(n)$$

Where:
n=0 to 7,
X(n) are the transform results integer numerators in place of transform constants
sf(n) are the scaling factors for S(n).

For example, in the example above sf(1) is 1/(2*41.0889)) and might be described generally as a value which compensates for changes made in a transform equation such that the right side of the equation (i.e.: X(n)) does not equal S(n). Accordingly this includes the relevant floating point denominator.

Accordingly sf(n) values for each set of approximations are known at design time which is when the integer numerator and floating point denominators are fixed for the various cost levels. As a result, in the preferred embodiment of the present invention, these values are calculated to full precision at design time without incurring a performance overhead at run time.

Further the Q(n) constants are known at initialization time. As a result Q(n)/sf(n) can be calculated at initialization time and need only be calculated a maximum of 8 times for a given data set (it may be less than 8 because some sf(n) values and Q(n) constants may be the same). Accordingly, in the preferred embodiment of the present invention this calculation is also performed in full precision and incurs a negligible performance overhead for a jpeg image when it is considered that a typical image will comprise well in excess of 10,000 pixels (i.e.: 10,000 X(n) for n=0 to 7).

As a result of performing these calculations before run time, the calculation that remains to be performed at runtime for each pixel is;

$$S(n)/Q(n)=q(n)*X(n)$$

Where:
n=0 to 7
q(n)=sf(n)/Q(n)

However, this calculation involves floating point values q(n) and as a result, in the preferred embodiment of the present invention, these are converted to fixed precision for the purposes of the calculation. This requires a shift left by "n" bits and rounding (or truncation) of the remainder after the decimal point, before the calculation is performed, and a shift right by "n" bits of the result. Note that a shift left can also be described as a multiply by 2 to the power "n", and a shift right as a divide by 2 to the power "n", and further this may also be described as selecting a precision of "n". In such a calculation error is introduced by the rounding (or truncation) after the shift left and as a result, in general, the greater value of "n" the smaller the error introduced. This can be illustrated by example.

For example, if it is required to multiply by a value by 0.7071 the following table shows, for various precisions (values of n): the shifted left value, the rounded shifted left value which is used in a calculation; the right shifted rounded value (which is the effective number used in place of 0.7071 in the calculation); and the effective error which is the difference between 0.7071 and the right shifted rounded value used in the calculation:

| n | value << n | rounded value | rounded value >> n | effective error |
|---|---|---|---|---|
| 0 | 0.7071 | 1 | 1 | −0.2929 |
| 1 | 1.4142 | 1 | 0.5000 | +0.2071 |
| 2 | 2.8284 | 3 | 0.7500 | +0.0429 |
| 3 | 5.6568 | 6 | 0.7500 | +0.0429 |
| 4 | 11.3136 | 11 | 0.6875 | −0.0196 |
| 5 | 22.6272 | 23 | 0.78175 | +0.0116 |
| 6 | 45.2544 | 45 | 0.703125 | −0.003975 |
| 7 | 90.5088 | 91 | 0.7109375 | +0.0038375 |
| 8 | 181.0176 | 181 | 0.70703125 | +0.00006875 |
| 9 | 362.0352 | 362 | 0.70703125 | +0.00006875 |
| 10 | 724.0704 | 724 | 0.70710000 | 0.0 |

From this table it can be seen that, in general, as precision is increased the effective error decreases but the greater the number of bits required to load the rounded value into memory and therefore the greater the number of bits required to perform the calculation with the rounded value. As a result it can be seen that there is a trade-off between the amount of error which may be introduced and the number of bits required to perform the calculation. Also, note that that in this example the error reduces to 0 for precision 10 because the example used a number to only four decimal places. However, in general when considering number to more decimal places the precision at which error will become 0 will be higher.

However, the inventors have further observed that increased precision does not, in all cases, result in less error. For example, when looking at the value 0.7071 it can be seen from the table above that an increase from precision 2 to precision 3, and from precision 8 to precision 9, does not result in less effective error. This is because, for example, the binary representation of the rounded value for precision 2 is "11" and the rounded value for precision 3 is "110". As a result the first shift of the precision 3 value simply loses a "0" value which is nothing. From this it can be seen that for each trailing "0" in the binary representation of a rounded value, a single drop of precision is possible without increasing the effective error. Therefore, if the binary representation of the rounded value has n trailing "0"s it is possible to drop n levels of precision without increasing the effective error.

Accordingly in the preferred embodiment of the present invention the precision selected for q(n) when converting to fixed precision is the minimum precision available for the acceptable level of error. In other words the value to be converted to fixed precision for the purposes of calculation is multiplied by a power of 2 which is determined to be the smallest power of 2 which results in a predetermined acceptable error.

Figure 7:
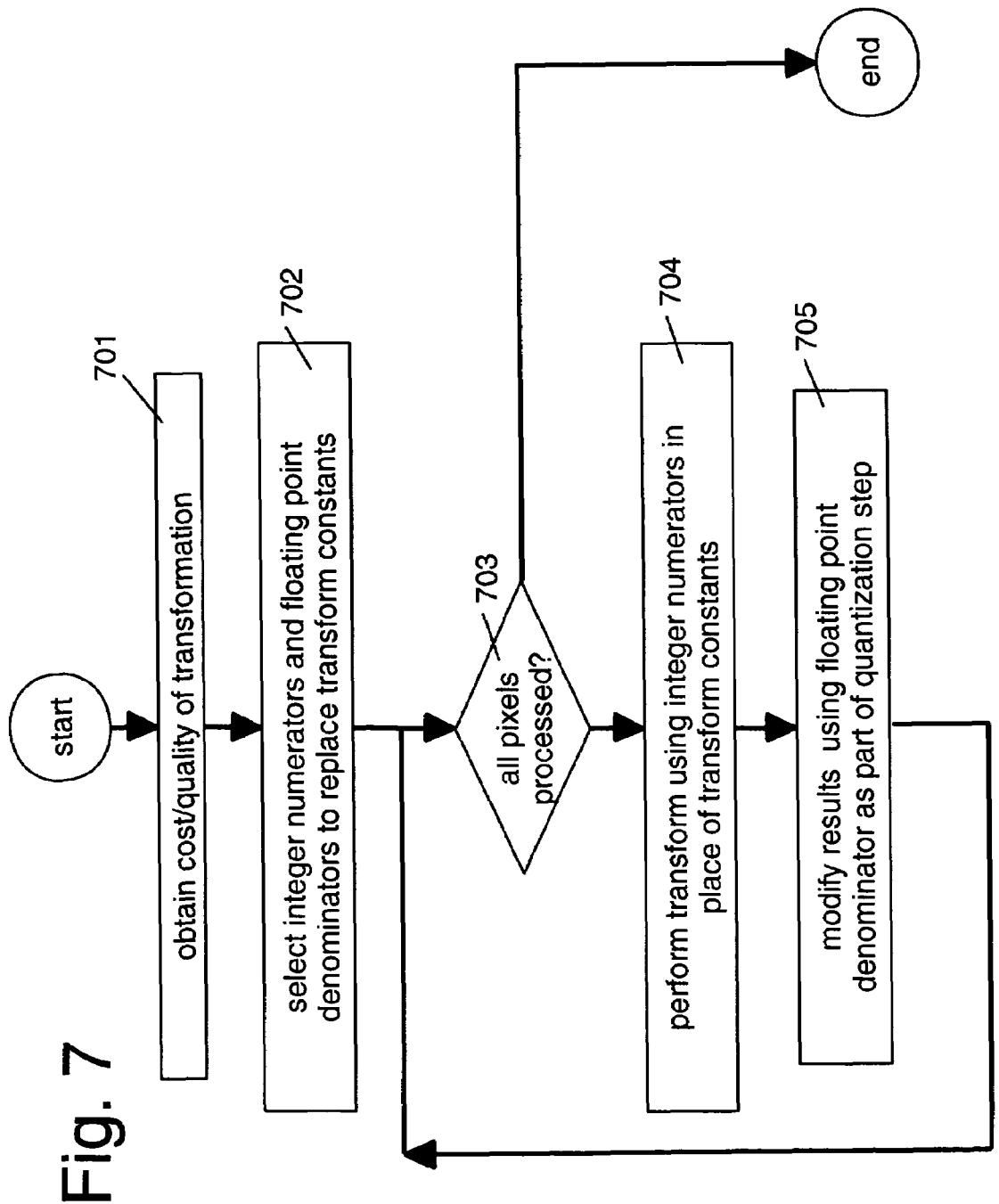
FIG. 7 is a flow chart of transforming a JPEG image according to the preferred embodiment of the present invention.
Figure 8:
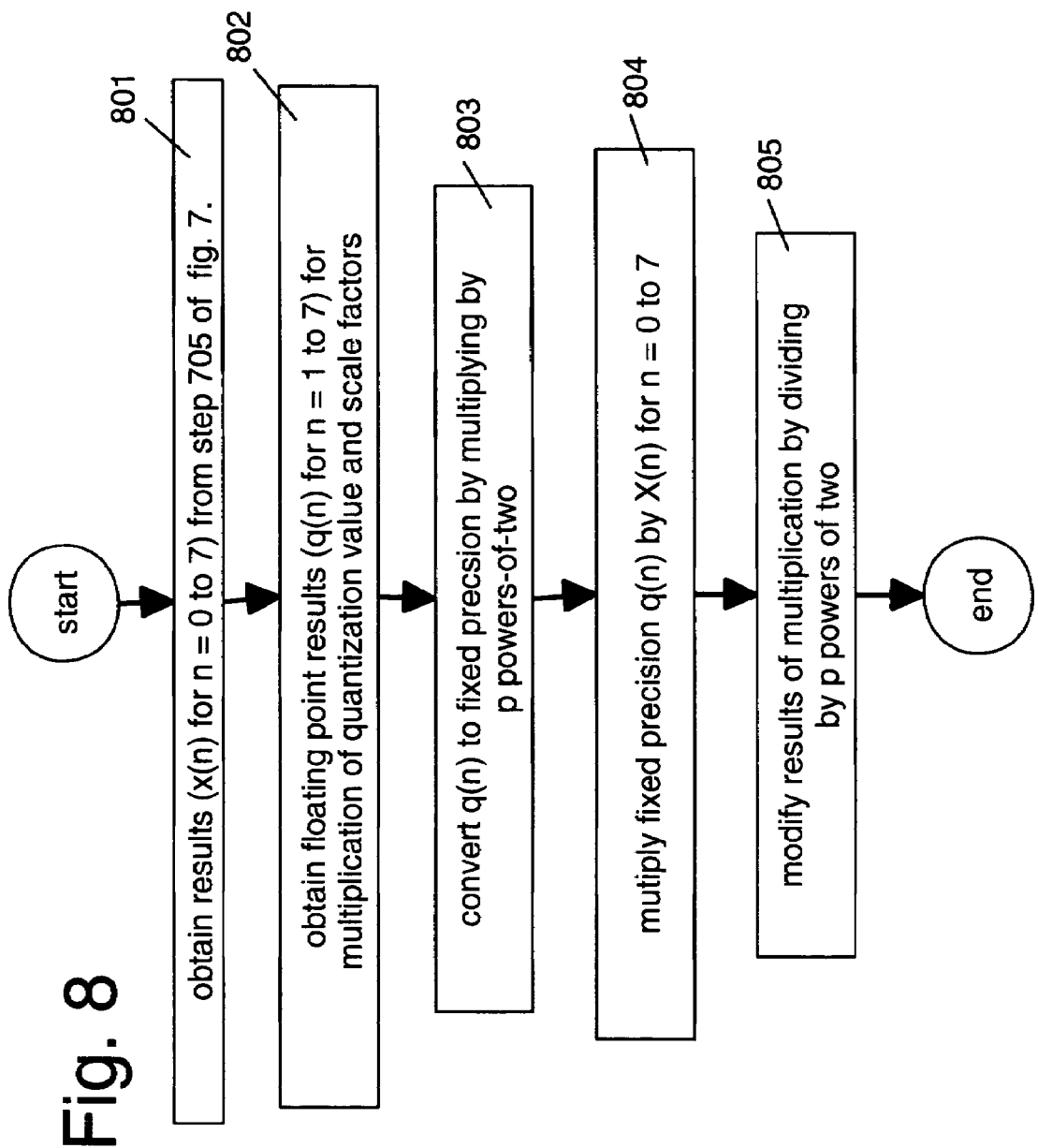
FIG. 8 is a flow chart of a quantization step according to the preferred embodiment of the present invention.

FIGS. 7 and 8 are flow charts of FDCT processing of a JPEG image according to the preferred embodiment of the present invention. FIG. 7 shows the overall transformation process and FIG. 8 provides details of the quantization step.

In FIG. 7, at step 701 an indication of the quality of the image required after transformation is obtained. This indicates how much error would be tolerated as a result of the transformation given that the higher the image quality required the more the execution time required to perform the transformation. For example, when considering the calculation relating to S(1), S(3), S(5) and S(7), the lowest quality image could use the approximations shown in FIG. 5, the highest quality image could use the approximations shown in FIG. 6, and intermediate qualities could use the approximations in FIGS. 3 and 4. Accordingly, at step 702 appropriate approximations are chosen according to the quality specified. Once the approximations have been chosen, a loop is started at step 703 to process each of the pixels of the JPEG image, each pixel comprising values s(n) for n=0 to 7. In the loop at step 704 the transform equations are calculated for the pixel being processed with the numerator of the approximations used in place of the constants which they are used to approximate. The results form these calculations, denoted X(n) in the example previously described, are then each quantized at step 705 and at this stage the floating point denominators of the approximations are factored into the calculations.

FIG. 8 is a more detailed flow chart of the quantization step shown as step 705 of FIG. 7. At step 801 the results, X(n) for n=0 to 7, of the transformation calculations from step 704 of FIG. 7 are obtained and at step 802 the results, q(n) for n=0 to 7, of floating point multiplications of the quantization value and scale factors, sf(n) for n=0 to 7, are obtained. Each scale factor includes the relevant floating point values from the approximations chosen at step 702 of FIG. 7. At step 803 q(n), for n=0 to 7, are converted to fixed precision and this is done by shifting the binary representations of the values p bits to the left and rounding after the decimal point to leave an integer. Then, at step 804, the multiplications of X(n) and q(n), for n=0 to 7 are performed using the fixed precision q(n). Finally at step 805 the binary representations of the results of the multiplication are shifted by p bits to the right to effectively undo the left shifts at step 803. This leaves the values which comprise the quantized version of the transformed image.

Note that whilst FIGS. 7 and 8 illustrate a method which is used, for example, to transform and quantize a JPEG image for storage and/or transmittal using a forward DCT, the present invention can equally be applied to reconstructing a transformed and quantized jpeg image, using an inverse DCT. In this case the quantization step 705 would be changed to a de-quantization step and performed after step 702 but before step 704. Further, a de-quantization step requires multiplication by the quantization value as opposed to the division which is done for an FDCT, and further the input data to the transform is modified rather than the result of the transform.

Further note that whilst the embodiment has been described in terms of a single 1-D fast DCT, a skilled person will realize that the invention could equally be applied to other 1-D fast DCTs and further 2-D fast DCTs. Similarly a skilled person will realize that the invention could also be applied to other transforms such a discrete Fourier transforms (DFT), and wavelet transforms. Also note that in such other transforms a constant can be any constant which is used for multiplication and note that a such a constant could be the value 1 (or $C_0$ which equals 1).

Further note that the approximations specified in FIGS. 3 to 6 are only intended as examples because, for a given set of numerators, there are many possible floating point denominators which will provide less error than the prior art. Further there are other possible integer and floating point denominator approximations which provide less error than those in FIGS. 3 to 6. It is within the skills of a skilled person to find such other floating point denominators even if this is simply by trial and error.

Further note that whilst the preferred embodiment of the present invention has been discussed in terms of an integer denominator and floating point denominator it could equally be implemented with an integer numerator and floating point numerator. In this case the floating point numerator would be the inverse of the floating point value of the preferred embodiment of the present invention.

Note that a skilled person in the art will realize that the method described with reference to FIGS. 7 and 8 could be implemented in a variety of programming languages, for example, Java™, C, and C++ (Java is a registered trademark of Sun Microsystems, Inc. in the United States, other countries, or both.), and would further realize that the order of the steps may be varied, for example step 705 could be removed from the loop including step 704 and performed in a separate loop. Further a skilled person will realize that once implemented the methods can be stored in a computer program product comprising one or more programs, in source or executable form, on a media, such as floppy disk, CD, and DVD, suitable for loading onto a data processing host and causing the data processing host to carry out the methods.

Figure 9:
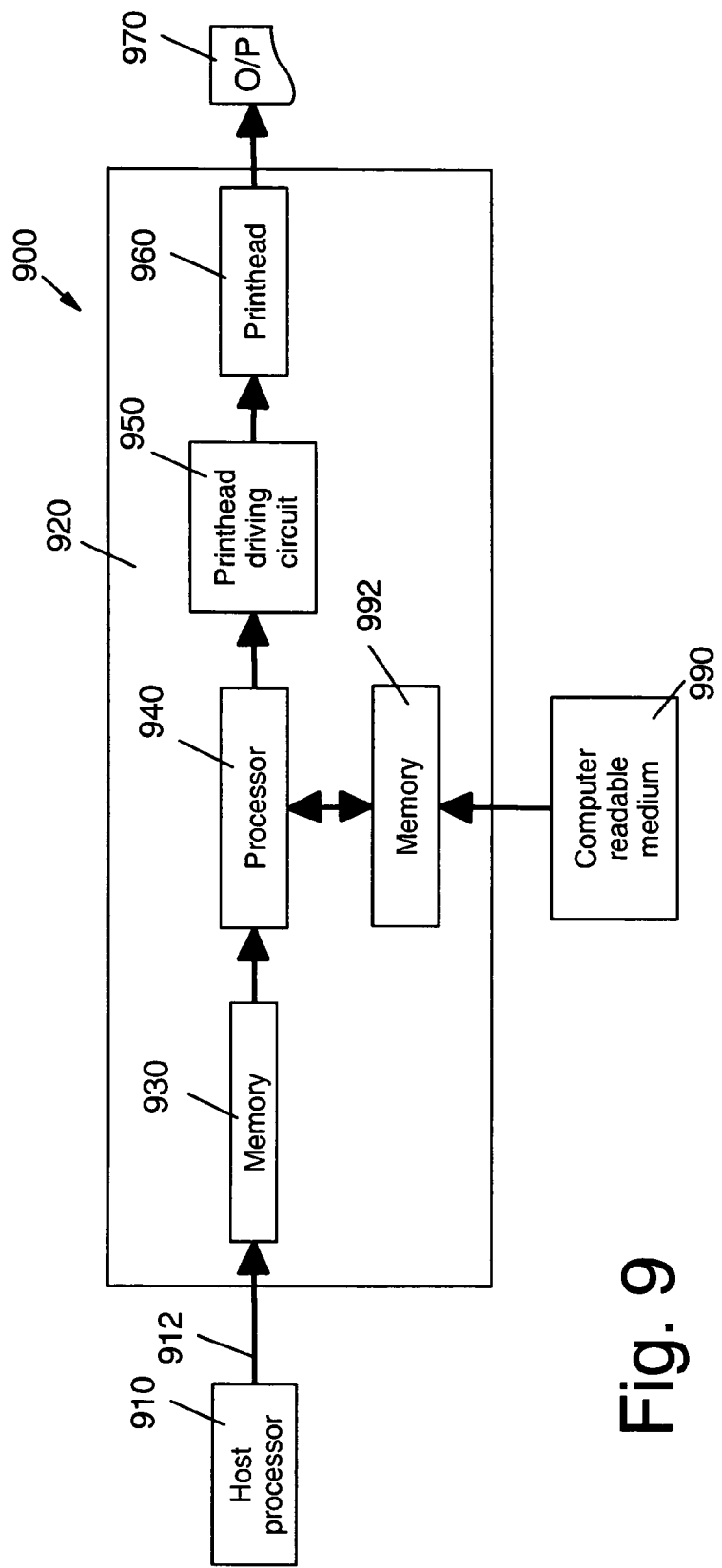
FIG. 9 is a block diagram of a printer according to the preferred embodiment of the present invention.

FIG. 9 illustrates a block diagram 900 of a printer 910 according to the present invention. In FIG. 9, the printer 920 receives image data 912 from a host processor 910. The image data 912 is provided into memory 930 where the image data may be arranged into 8×8 block samples. The 8×8 block samples are then processed by a processor 940, such as a raster image processor. The raster image processor 940 provides a compressed print stream representing the image data to a printhead driving circuit 950. The printhead driving circuit 950 then controls the printhead 960 to generate a printout 970 of the image data.

The process illustrated with reference to FIGS. 7 and 8 may be tangibly embodied in a computer-readable medium/carrier 990, e.g. one or more of the fixed and/or removable data storage devices illustrated in FIG. 9, or other data storage or data communications devices. The computer program may be loaded into the memory 992 to configure the processor 940 of FIG. 9, for execution. The computer program comprises instructions which, when read and executed by the processor 940 of FIG. 9, causes the processor 940 to perform the steps necessary to execute the steps or elements of the present invention.

FIG. 10 illustrates a data analyzing system 1000 according to the present invention. In FIG. 10, a transformer 1010 receives a block of data 1012 to be analyzed. The transformer 1010 uses transform equations 1020 to generate transformed data 1024. A transform constant in a transform equation is identified and an approximation, which is a function of an integer value and floating point value, is determined for the constant. The transform equation is then performed using the integer value in place of the constant and a result is obtained. The result is then modified using the floating point value to produce transformed data 1024. The transformed data 1024 may then be optionally quantized by quantizer 1030, in which case modification of the result using the floating point value may be deferred for performance by the quantizer.

FIG. 11 illustrates another data analyzing system 1100 according to the present invention. In FIG. 11, a transformer 1110 receives a block of data 1112 to be analyzed. The transformer 1110 uses transform equations 1120 to generate transformed data 1124. A transform constant in a transform equation is identified and an approximation, which is a function of an integer value and floating point value, is determined for the constant. The transform equation is then performed using the integer value in place of the constant and a result is obtained. The result is then modified using the floating point value to produce transformed data 1124. The transformed data 1124 may then be compared to comparison values in comparator 1130, in which case modification of the result using the floating point value may be deferred for performance by the comparator.

In summary the invention provides a method, data compression system, apparatus, and article of manufacture which reduce the error in transform equations in which constants are replaced by approximations. According to the invention transform constants are replaced with approximations which are a function of an integer and a floating point value. The transform equation is then performed with the integers in place of the constants. The floating point value may be applied either to the result of the equation or to the data to be processed by the transform equation before the equation is performed. Further the floating point value may be applied using a fixed precision version of the value or a fixed precision value into which the floating point value has been factored.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of reducing an error in a result of a transform equation, the method comprising:
    determining, for a transform constant of the transform equation, an integer value and a floating point value, wherein a function of the integer value and the floating point value approximates to the transform constant;
    performing the transform equation, using the integer value in place of the transform constant, to produce the result; and
    modifying the result using the floating point value to reduce the error.

2. The method of claim 1 wherein the transform equation comprises one or more additional transform constants and wherein:
    determining further comprises determining an integer value for each additional transform constant, wherein a function of each integer value and the floating point value is an approximation to the transform constant for which the integer value was determined; and
    performing further comprises performing the transform equation using each integer value in place of the additional transform constant for which the integer value was determined.

3. The method of claim 2 wherein each integer value and the floating point value are determined according to an error and/or cost related requirement.

4. The method of claim 1 wherein the floating point value is converted to a fixed precision value and the fixed precision value is used for modifying the result.

5. The method of claim 1 wherein modifying the result using the floating point value is performed as part of a quantization step.

6. The method of claim 5 wherein the quantization step calculates a quantized result of the transform equation by:
    obtaining a multiplication value which results from performing a floating point multiplication of a quantization value and a scaling factor, wherein the scaling factor comprises the floating point value;
    converting the multiplication value to fixed precision; and
    using the converted multiplication value to modify the result.

7. The method of claim 6 wherein converting the multiplication value comprises multiplying the multiplication value by a power of 2, wherein the power of 2 selected is determined to be the smallest power of 2 which results in a predetermined acceptable error.

8. A method of reducing an error in a result of a transform equation, the method comprising:
    determining an integer value for each of a plurality of transform constants of the transform equation and a common floating point value, wherein each integer value is determined according to an error and/or cost related requirement and wherein each transform constant is a function of the integer value determined for it and the common floating point value;
    performing the transform equation, using each integer value in place of the transform constant for which the integer value was determined to obtain the result;
    converting the common floating point value to a fixed precision value;
    modifying the result using the fixed precision value as part of a quantization step to reduce the error.

9. A method of reducing an error in a result of a transform equation, the method comprising:
    transforming a jpeg image using the transform equation, transforming the jpeg image comprising:
        determining an integer value for each of a plurality of transform constants of the transform equation and a common floating point value, wherein each integer value is determined according to an error and/or cost related requirement and wherein each transform constant is a function of the integer value determined for it and the common floating point value;

performing the transform equation, using each integer value in place of the transform constant for which the integer value was determined to obtain the result;

obtaining a multiplication value which results from performing a floating point multiplication of a quantization value and a scaling factor, wherein the scaling factor comprises the common floating point value;

converting the multiplication value to fixed precision; and using the converted multiplication value to modify the result to reduce the error.

10. The method of claim 9 wherein converting the multiplication value comprises multiplying the multiplication value by a power of 2, wherein the power of 2 selected is determined to be the smallest power of 2 which results in a predetermined acceptable error.

11. A method of reducing an error in a result of a transform equation, the method comprising:

determining for a transform constant of the transform equation an integer value and a floating point value, wherein a function of the integer value and the floating point value approximates to the transform constant;

modifying input data using the floating point value; and performing the transform equation on the modified data, using the integer value in place of the transform constant to reduce the error.

12. The method of claim 11 wherein the transform equation comprises one or more additional transform constants and wherein:

determining further comprises determining an integer value for each additional transform constant, wherein a function of each integer value and the floating point value is an approximation to the transform constant for which the integer value was determined; and performing further comprises performing the transform equation using each integer value in place of each additional transform constant for which the integer value was determined.

13. The method of claim 12 wherein each integer value and the floating point value are determined according to an error and/or cost related requirement.

14. The method of claim 11 wherein the floating point value is converted to a fixed precision value and the fixed precision value is used for modifying the input data.

15. The method of claim 11 wherein modifying the data using the floating point value is performed as part of a de-quantization step.

16. The method of claim 15 wherein the de-quantization step modifies the input data by:

obtaining a multiplication value which results from performing a floating point calculation with a quantization value and a scaling factor, wherein the scaling factor comprises the floating point value;

converting the multiplication value to fixed precision; and using the converted multiplication value to modify the input data.

17. The method of claim 16 wherein converting the multiplication value comprises multiplying the multiplication value by a power of 2, wherein the power of 2 selected is determined to be the smallest power of 2 which results in a predetermined acceptable error.

18. A method of reducing an error in a result of a transform equation, the method comprising:

determining an integer value for each of a plurality of transform constants of the transform equation and a common floating point value, wherein each integer value is determined according to an error and/or cost related requirement and wherein each transform constant is a function of the integer value determined for it and the common floating point value;

converting the floating point value to a fixed precision value;

modifying input data using the fixed precision value as part of a de-quantization step; and performing the transform equation on the input data using each integer value in place of the transform constant for which the integer value was determined, to reduce the error.

19. A method of reducing an error in a result of a transform equation, the method comprising:

determining an integer value for each of a plurality of transform constants and a common floating point value, wherein the values are determined according to an error and/or cost related requirement and wherein each transform constant is a function of the integer value determined for it and the common floating point value;

obtaining a multiplication value which results from performing a floating point calculation with a quantization value and a scaling factor, wherein the scaling factor comprises the floating point value;

converting the multiplication value to fixed precision; and using the converted multiplication value to modify jpeg image data; and performing the transform equation on the jpeg image data using each integer value in place of the transform constant for which the integer was determined to reduce the error.

20. The method of claim 19 wherein converting the multiplication value comprises multiplying the multiplication value by a power of 2, wherein the power of 2 selected is determined to be the smallest power of 2 which results in a predetermined acceptable error.

21. A data compression system comprising:

a transformer for:

performing a transform equation by determining, for a transform constant of the transform equation, an integer value and a floating point value, wherein a function of the integer value and floating point value approximates to the transform constant value; and performing the transform equation, using the integer value in place of the transform constant, to produce a result; and a quantizer for:

modifying the result using the floating point value.

22. The data compression system of claim 21 wherein the transform equation comprises one or more additional transform constants and wherein:

the transformer further determines an integer value for each additional transform constant, wherein a function of each integer and the floating value is an approximation to the transform constant value for which the integer was determined, and further performs the transform equation using each integer value in place of the transform constant value for which the integer was determined.

23. The data compression system of claim 22 wherein the transformer determines the integer values and floating pointing value according to an error and/or cost related requirement.

24. The data compression system of claim 21 wherein the quantizer converts the floating point value to fixed precision before using it to modify the result.

25. The data compression system of claim 21 wherein the quantizer modifies the result by:

obtaining a multiplication value which resulted from performing a floating point multiplication of a quantization value and a scaling factor, wherein the scaling factor comprises the floating point value;
converting the multiplication value to fixed precision; and
using the converted multiplication value to modify the result.

26. The data compression system of claim 25 wherein the quantizer converts the multiplication by multiplying the multiplication value by a power of 2, wherein the power of 2 selected is determined to be the smallest power of 2 which results in a predetermined acceptable error.

27. A data compression system comprising:
a transformer for performing a transform equation by:
determining an integer value for each of a plurality of transform constants of the transform equation and a common floating point value, wherein the values are determined according to an error and/or cost related requirement and each transform constant is a function of integer value determined for it and the common floating point value; and
performing the transform equation using each integer value in place of the transform constant for which the integer was determined; and
a quantizer for modifying the result by:
converting the floating point value to a fixed precision value and modifying the result using the fixed precision value.

28. A data compression system comprising:
a transformer for transforming a jpeg image using a transform equation by determining an integer value for each of a plurality of transform constants and a common floating point value wherein each transform constant is a function of integer value determined for it and the common floating point value, and performing the transform equation using each integer value in place of the transform constant for which the integer was determined; and
a quantizer for modifying the result by obtaining a multiplication value which results from performing a floating point multiplication of a quantization value and a scaling factor, wherein the scaling factor comprises the floating point value, converting the multiplication value to fixed precision, and using the multiplication value to modify the result.

29. The data compression system of claim 28 wherein the quantizer converts the multiplication by multiplying the multiplication value by a power of 2, wherein the power of 2 selected is determined to be the smallest power of 2 which results in a predetermined acceptable error.

30. A apparatus comprising:
memory for storing image data;
a processor for processing the image data to provide a compressed print stream output; and
a printhead driving circuit for controlling a printhead to generate a printout of the image data; wherein the processor applies a transform equation to the image data by:
determining, for a transform constant of a transform equation, an integer value and a floating point value, wherein a function of the integer value and floating point value approximates to the transform constant value;
modifying the image data using the floating point value; and
performing the transform equation on the modified image data and using the integer value in place of the transform constant.

31. The apparatus of claim 30 wherein the transform equation comprises one or more additional transform constants and the processor applies the transform equation by further determining an integer value for each additional transform constant, wherein a function of each integer and the floating point value is an approximation to the transform constant for which the integer was determined; and
performing the transform equation using each integer value in place of the additional transform constant value for which the integer was determined.

32. The apparatus of claim 31 where the processor determines the integer values and floating pointing value according to an error and/or cost related requirement.

33. The apparatus of claim 30 wherein the processor converts the floating point value to fixed precision before it is used for modifying the image data.

34. The apparatus of claim 30 method wherein the processor modifies the image data using the floating point value by:
obtaining a multiplication value which results from performing a floating point calculation with a quantization value and a scaling factor, wherein the scaling factor comprises the floating point value;
converting the multiplication value to fixed precision; and
using the converted multiplication value to modify the image data.

35. The apparatus of claim 34 wherein the processor, when converting the multiplication value to fixed precision, multiplies the multiplication value by a power of 2, wherein the power of 2 selected is determined to be the smallest power of 2 which results in a predetermined acceptable error.

36. A apparatus comprising:
memory for storing image data;
a processor for processing the image data to provide a compressed print stream output; and
a printhead driving circuit for controlling a printhead to generate a printout of the image data; wherein the processor applies a transform equation to the image data by:
determining an integer value for each of a plurality of transform constants of a transform equation and a common floating point value wherein each transform constant is a function of the integer value determined for it and the common floating point value;
obtaining a multiplication value which results from performing a floating point calculation with a quantization value and a scaling factor, wherein the scaling factor comprises the floating point value; converting the multiplication value to fixed precision; using the multiplication value to modify the image data; and
performing the transform equation on the modified image data using each integer value in place of the transform constant for which the integer was determined.

37. The apparatus of claim 36 wherein the processor, when converting the multiplication value to fixed precision, multiplies the multiplication value by a power of 2, wherein the power of 2 selected is determined to be the smallest power of 2 which results in a predetermined acceptable error.

38. An article of manufacture comprising a program storage medium readable by a computer, the medium tangibly embodying one or more programs of instructions executable by a computer to perform a method for reducing an error in a result of a transform equation, the method comprising:
determining, for a transform constant of the transform equation, an integer value and a floating point value, wherein a function of the integer value and the floating point value approximates to the transform constant;

performing the transform equation, using the integer value in place of the transform constant, to produce the result; and modifying the result using the floating point to reduce the error.

39. The article of manufacture of claim 38 wherein the transform equation comprises one or more additional transform constants and wherein:

determining further comprises determining an integer value for each additional transform constant, wherein a function of each integer and the floating point value is an approximation to the transform constant for which the integer value was determined; and performing further comprises performing the transform equation using each integer value in place of the additional transform constant value for which the integer was determined.

40. The article of manufacture of claim 39 wherein each integer value and the floating point value are determined according to an error and/or cost related requirement.

41. The article of manufacture of claim 38 wherein the floating point value is converted to a fixed precision value and the fixed precision value is used for modifying the result.

42. The article of manufacture of claim 38 wherein modifying the result using the floating point value is performed as part of a quantization step.

43. The article of manufacture of claim 42 wherein the quantization step calculates a quantized result of the transform equation by:

obtaining a multiplication value which results from performing a floating point multiplication of a quantization value and a scaling factor, wherein the scaling factor comprises the floating point value;

converting the multiplication value to fixed precision; and using the multiplication value to modify the result.

44. The article of manufacture of claim 43 wherein converting the multiplication value comprises multiplying the multiplication value by a power of 2, wherein the power of 2 selected is determined to be the smallest power of 2 which results in a predetermined acceptable error.

45. An article of manufacture comprising a program storage medium readable by a computer, the medium tangibly embodying one or more programs of instructions executable by a computer to perform a method for reducing an error in a result of a transform equation, the method comprising:

determining an integer value for each of a plurality of transform constants of the transform equation and a common floating point value, wherein each integer values is determined according to an error and/or cost related requirement and wherein each transform constant is a function of the integer value determined for it and the common floating point value;

performing the transform equation, using each integer value in place of the transform constant for which the integer value was determined to obtain the result;

converting the common floating point value to a fixed precision value;

modifying the result using the fixed precision value as part of a quantization step to reduce the error.

46. An article of manufacture comprising a program storage medium readable by a computer, the medium tangibly embodying one or more programs of instructions executable by a computer to perform a method for reducing an error in a result of a transform equation, the method comprising:

transforming a jpeg image using the transform equation, transforming the jpeg image comprising:

determining an integer value for each of a plurality of transform constants and a common floating point value, wherein each integer value is determined according to an error and/or cost related requirement and wherein each transform constant is a function of the integer value determined for it and the common floating point value;

performing the transform equation, using each integer value in place of the transform constant for which the integer value was determined to obtain the result;

obtaining a multiplication value which results from performing a floating point multiplication of a quantization value and a scaling factor, wherein the scaling factor comprises the common floating point value;

converting the multiplication value to fixed precision; and using the converted multiplication value to modify the result to reduce the error.

47. The article of manufacture of claim 46 wherein converting the multiplication value comprises multiplying the multiplication value by a power of 2, wherein the power of 2 selected is determined to be the smallest power of 2 which results in a predetermined acceptable error.

48. An article of manufacture comprising a program storage medium readable by a computer, the medium tangibly embodying one or more programs of instructions executable by a computer to perform a method for reducing an error in a result of a transform equation, the method comprising:

determining, for a transform constant of the transform equation, an integer value and a floating point value, wherein a function of the integer value and the floating point value approximates to the transform constant;

modifying input data using the floating point value; and performing the transform equation on the modified data, using the integer value in place of the transform constant to reduce the error.

49. The article of manufacture of claim 48 wherein the transform equation comprises one or more additional transform constants and wherein:

determining further comprises determining an integer value for each additional transform constant, wherein a function of each integer value and the floating point value is an approximation to the transform constant for which the integer value was determined; and performing further comprises performing the transform equation using each integer value in place of each additional transform constant for which the integer value was determined.

50. The article of manufacture of claim 49 wherein each integer value and the floating point value are determined according to an error and/or cost related requirement.

51. The article of manufacture of claim 48 wherein the floating point value is converted to a fixed precision value and the fixed precision value is used for modifying the input data.

52. The article of manufacture of claim 48 wherein modifying the data using the floating point value is performed as part of a de-quantization step.

53. The article of manufacture of claim 52 wherein the de-quantization step modifies the input data by:

obtaining a multiplication value which results from performing a floating point calculation with a quantization value and a scaling factor, wherein the scaling factor comprises the floating point value;

converting the multiplication value to fixed precision; and using the converted multiplication value to modify the input data.

54. The article of manufacture of claim 53 wherein converting the multiplication value comprises multiplying the multiplication value by a power of 2, wherein the power of 2 selected is determined to be the smallest power of 2 which results in a predetermined acceptable error.

55. An article of manufacture comprising a program storage medium readable by a computer, the medium tangibly embodying one or more programs of instructions executable by a computer to perform a method of reducing an error in a result of a transform equation, the method comprising:
- determining an integer value for each of a plurality of transform constants of the transform equation an integer value and a common floating point value, wherein each integer value is determined according to an error and/or cost related requirement and each transform constant is a function of the integer value determined for it and the common floating point value;
- converting the common floating point value to a fixed precision value;
- modifying input data using the fixed precision value as part of a de-quantization step; and
- performing the transform equation on the input data using each integer value in place of the transform constant for which the integer value was determined to reduce the error.

56. An article of manufacture comprising a program storage medium readable by a computer, the medium tangibly embodying one or more programs of instructions executable by a computer to perform a method of reducing an error in a result of a transform equation, the method comprising:
- determining an integer value for each of a plurality of transform constants of the transform equation and a common floating point value, wherein each integer value is determined according to an error and/or cost related requirement and each transform constant is a function of the integer value determined for it and the common floating point value;
- obtaining a multiplication value which results from performing a floating point calculation with a quantization value and a scaling factor, wherein the scaling factor comprises the common floating point value;
- converting the multiplication value to fixed precision;
- using the converted multiplication value to modify jpeg image data; and
- performing the transform equation on the jpeg image data using each integer value in place of the transform constant for which the integer value was determined, to reduce the error.

57. The article of manufacture of claim 56 wherein converting the multiplication value comprises multiplying the multiplication value by a power of 2, wherein the power of 2 selected is determined to be the smallest power of 2 which results in a predetermined acceptable error.

* * * * *